United States Patent
Peasley (10) Patent No.: US 7,194,702 B1
(45) Date of Patent: Mar. 20, 2007

(54) SYSTEM METHOD APPARATUS AND SOFTWARE FOR MINIMIZING UNINTENDED CURSOR MOVEMENT

(75) Inventor: Richard A. Peasley, Elk Point, SD (US)

(73) Assignee: Gateway Inc., Irvine, CA (US)

(*) Notice: Subject to any disclaimer, the term of this patent is extended or adjusted under 35 U.S.C. 154(b) by 0 days.

(21) Appl. No.: 09/343,143

(22) Filed: Jun. 29, 1999

(51) Int. Cl.
 *G06F 3/00* (2006.01)
(52) U.S. Cl. ............... 715/856; 715/863; 715/857; 715/764; 715/858; 345/156; 345/157
(58) Field of Classification Search ............ 345/856, 345/863, 857, 156, 157, 764, 700, 858; 382/202, 382/195, 197, 190; 571/856, 863, 857, 764, 571/858
See application file for complete search history.

(56) References Cited

U.S. PATENT DOCUMENTS

| | | | | |
|---|---|---|---|---|
| 5,025,382 A | * | 6/1991 | Artz | ............... 364/439 |
| 5,027,109 A | | 6/1991 | Donovan et al. | ........... 340/706 |
| 5,264,836 A | * | 11/1993 | Rubin | ............... 345/157 |
| 5,870,079 A | * | 2/1999 | Hennessy | ............... 345/159 |

* cited by examiner

*Primary Examiner*—Ba Huynh
*Assistant Examiner*—Mylinh Tran
(74) *Attorney, Agent, or Firm*—Jeffrey A. Proehl; Woods Fuller Schultz & Smith PC

(57) ABSTRACT

A system for minimizing unintended cursor movement in computer display systems, using GUI operating systems or software, that can result from such things as muscle spasms, or rough travel is disclosed. A cursor control device, such as a mouse, is monitored for signals of movement. Once a signal of movement has been received, the signal is then evaluated. This evaluation involves determining whether the signal for movement is ancillary to an intended movement or it is an intended movement. If the signal for movement is determined to be ancillary, it is then corrected. If the signal for movement is an intended movement, the signal is then passed on to the operating system for processing. The correcting can be done in the analog domain by utilizing a filter of some form, such as a bandpass filter, or it can be done in the digital domain by masking out undesired portions of the signals of movement and retaining only the portions of the signal that facilitate movement along an intended path.

15 Claims, 7 Drawing Sheets

SYSTEM METHOD APPARATUS AND SOFTWARE FOR MINIMIZING UNINTENDED CURSOR MOVEMENT

FIELD OF THE INVENTION

This invention relates generally to cursor control devices and, more particularly, to methods, apparatuses, systems and software for controlling erratic movement of a cursor by a cursor control device.

BACKGROUND OF THE INVENTION

Computers today have many means of obtaining input from a user. Today's computers have keyboards, mice, joysticks, microphones and many other devices attached to them in order to make their use easier. Some of these devices are easily manipulated by a user while others, such as the keyboard, may take time to learn. However, once learned, these devices present no difficulties to the user.

The most frequently used device in use by computers today is the mouse. The development of a friendlier computing environment, known as the Graphical User Interface or GUI, has fueled the demand for these cursor controlling devices. Many advancements have been made to make the computer mouse a more ergonomic and user friendly device. Some of these advancements include trackballs and touchpads which are not embodied as are typical computer mice; they do, however, employ the same principles for cursor movement.

Though these devices have been made more ergonomic, they still present certain difficulties in their use in some circumstances. For example, if the user of a mouse suffered from a muscle disorder, such as Alzheimer's disease, which prevented him/her from holding his/her hand steady, when this user tried to move the cursor in a straight line across the computer screen, the cursor would travel an erratic, typically sawtooth type path as a result of this hand shaking. For the situation mentioned above, should the user be operating a drawing program in which he/she is trying to trace out a smooth curve or to draw a straight line, quality results will be virtually impossible.

What is needed is a method and/or an apparatus for removing this erratic, cyclical, or repetitive motion, resulting in only the path intended to be traveled being traced out by the movement of the cursor on the computer screen.

SUMMARY OF THE INVENTION

Accordingly, the present invention provides a method for minimizing unintended cursor movement comprising monitoring an information signal indicative of movement of the cursor along an intended path, determining whether any portions of the information signal are not indicative of the intended path, and correcting the portions of the information signal which are not indicative of the intended path to form a corrected information signal.

The present invention further provides an apparatus for minimizing unintended cursor movement comprising a monitoring device configured to monitor an information signal indicative of movement of the cursor along an intended path, a comparing device configured to determine whether any portions of the monitored information signal are not indicative of the intended path, and a correcting device configured to remove the portions which are not indicative of the intended path to form a corrected information signal.

The present invention also provides an information handling system comprising at least one processor, memory operably associated with the processor, a display configured to display a cursor, a cursor control device configured to manipulate the cursor based upon information regarding movement of the cursor control device, and a correcting device configured to correct cursor control device movement information, removing information which is not indicative of an intended path for the cursor.

The present invention also provides a computer readable medium tangibly embodying a program of instructions for minimizing unintended cursor movement. The program of instructions implements the following: monitoring an information signal indicative of movement of the cursor along an intended path, determining whether any portions of the information signal are not indicative of the intended path, and correcting the portions of the information signal which are not indicative of the intended path to form a corrected information signal.

The present invention also provides a graphical user interface (GUI), in an information handling system having a cursor control device, for minimizing unintended cursor movement. The GUI comprises means for monitoring an information signal indicative of movement of the cursor along an intended path, means for determining whether any portions of the information signal are not indicative of the intended path, and means for correcting the portions of the information signal which are not indicative of the path to form a corrected information signal.

It is an object of the present invention to provide a means for minimizing unintended cursor movement.

It is an object of the present invention to provide a means for producing only the net results from an erratic signal.

It is another object of the present invention to minimize the effects shaking diseases have on cursor movement.

It is yet another object of the present invention to be able to detect erratic cursor movement.

The present invention provides the advantage of minimizing the effects of an erratic signal by reporting only the net results of a given signal.

The present invention also provides the advantage of minimizing the unintended cursor movement experienced by users with shaky hands and by mobile users working in less than perfect traveling conditions.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
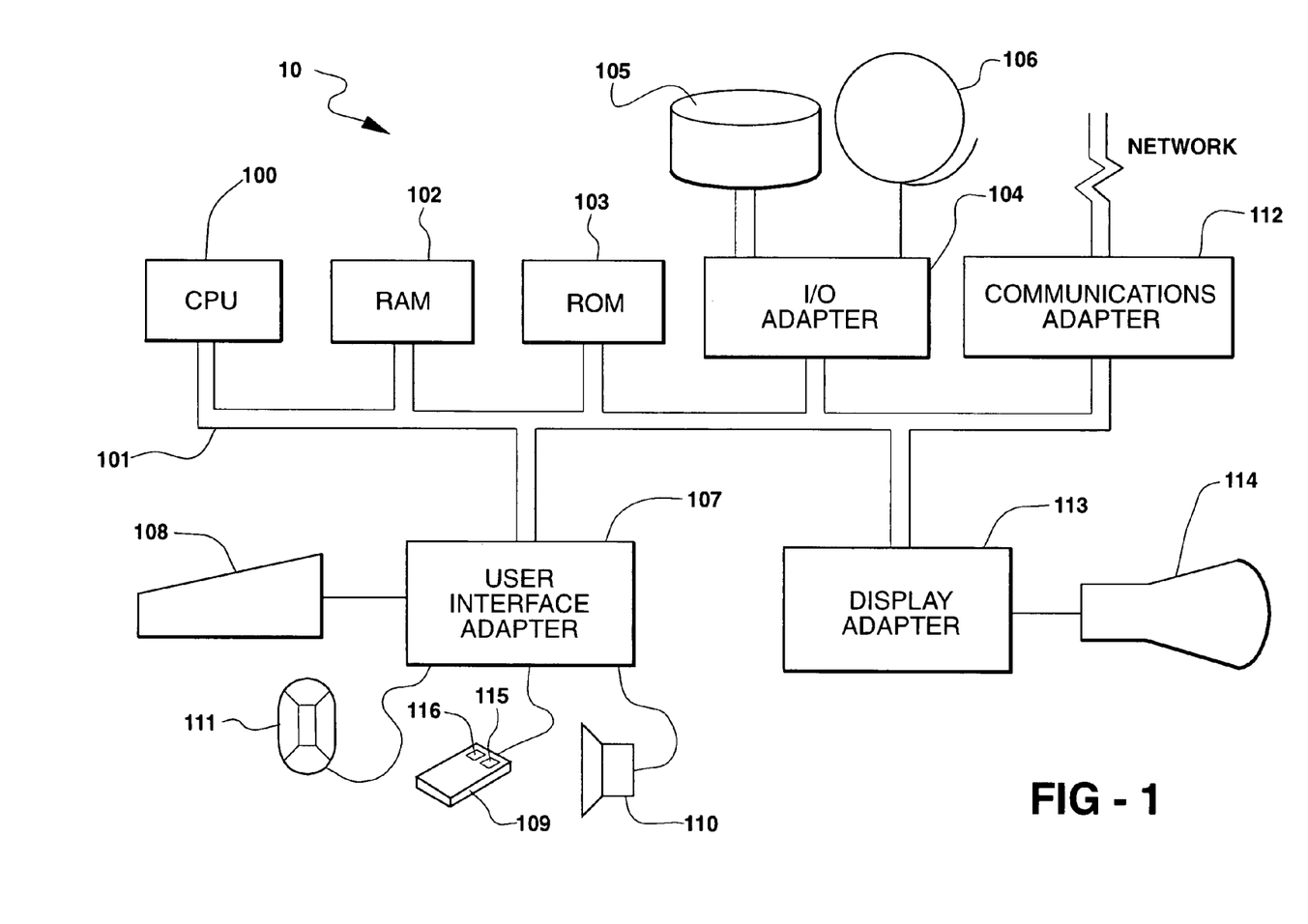
FIG. 1 illustrates a detailed block diagram showing a computer system according to a preferred embodiment of the present invention.

A representative hardware environment for practicing the present invention is depicted in FIG. 1, which illustrates a typical hardware configuration of an information handling system 10 in accordance with the subject invention, having a central processing unit 100, such as a conventional microprocessor, and a number of other units interconnected via at least one system bus 101. Information handling system 10 may be, for example, a portable or desktop Gateway computer (Gateway is a trademark of Gateway 2000, Inc.). Information handling system 10 shown in FIG. 1 includes random access memory (RAM) 102, read only memory (ROM) 103, and input/output (I/O) adapter 104 for connecting peripheral devices such as disk units 105 and tape drives 106 to system bus 101, a user interface adapter 107 for connecting keyboard 108, mouse 109, speaker 110, microphone 111, and/or other user interface devices to system bus 101, communications adapter 112 for connecting the workstation to an information network such as the Internet, and display adapter 113 for connecting system bus 101 to a display device such as monitor 114. Mouse 109 has a series of buttons 115, 116 and is used to control a cursor shown on monitor 114.

Figure 2:
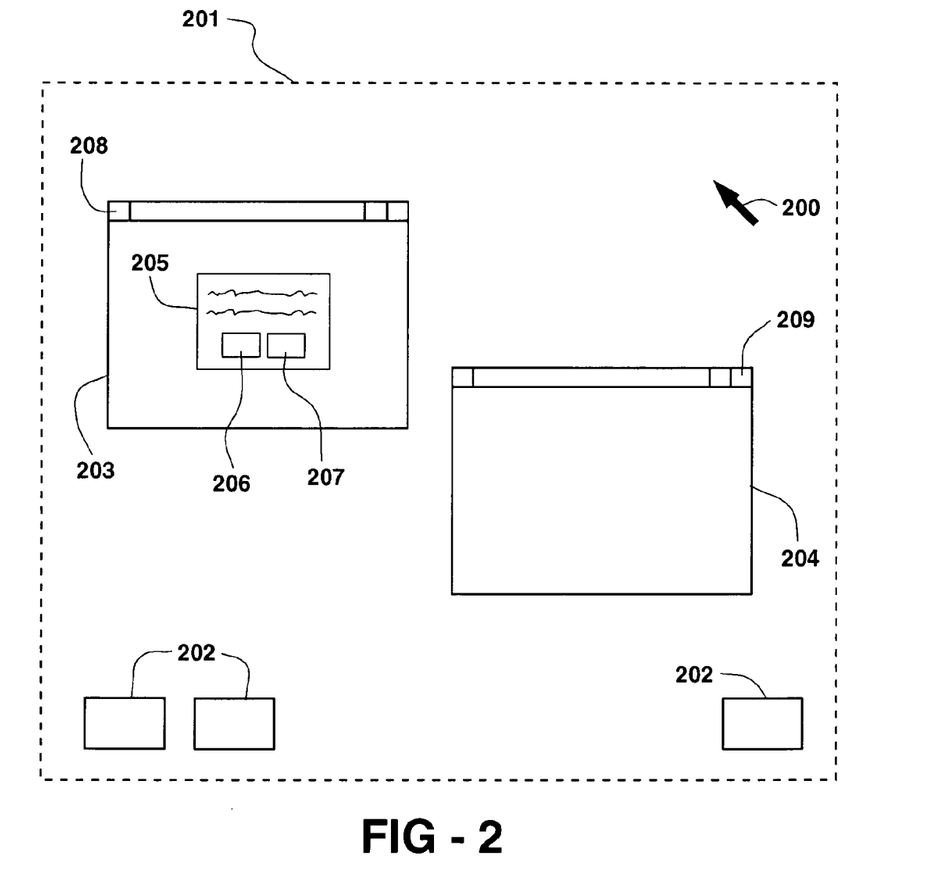
FIG. 2 shows the desktop of a computer operating system, typically employed on a computer system as in FIG. 1, using a graphical user interface according to the preferred embodiment of the present invention.

Referring next to FIG. 2, detail of an operating system's graphical user interface ("GUI") as is typically displayed on monitor 114 in accordance with the present invention is illustrated. Reference numerals or letters in FIG. 2 which are like, similar, or identical to the reference numerals or letters of FIG. 1 indicate like, similar, or identical components or features. The operating system shown in FIG. 2 is IBM's OS/2 (OS/2 is a trademark of International Business Machines Corporation); however, the present invention will work with Windows 98, Windows 95 (Windows 98 and Windows 95 are trademarks of Microsoft Corporation), or any other GUI. This GUI includes cursor 200, desktop 201, three icons 202, two windows 203, 204, and dialog box 205, all of which are well known in the art. Dialog box 205 further contains two buttons 206, 207. Programs are represented by the GUI as either icons 202 or windows 203, 204. The horizontal region along the top of a window is called the "title bar" 208, 209. A program window 203, 204 has the "focus" when it has been designated by the user or by the operating system to receive input from keyboard 108 or mouse 109. In OS/2®, the user gives the window focus by clicking a mouse button 115, 116 when cursor 200 is inside that window. Some operating systems, however, give a window the focus merely whenever cursor 200 is present within that window. The operating system indicates which program has the focus by changing the color of the focused window's title bar 208, 209.

As mentioned above, movement of cursor 200 is controlled by mouse 109 or other pointing device such as a trackball (not shown). Typically in an operating system, when a user moves mouse 109, CPU 100 sends an information signal to the operating system that a mouse event has occurred. The operating system then processes this information signal by moving cursor 200 and putting the information signal in an event queue where it can be examined by interested programs. A preferred embodiment of the present invention will have CPU's 100 information signal that a mouse event has occurred be processed by the routine disclosed herein before sending this mouse event information signal to the operating system.

Figure 3:
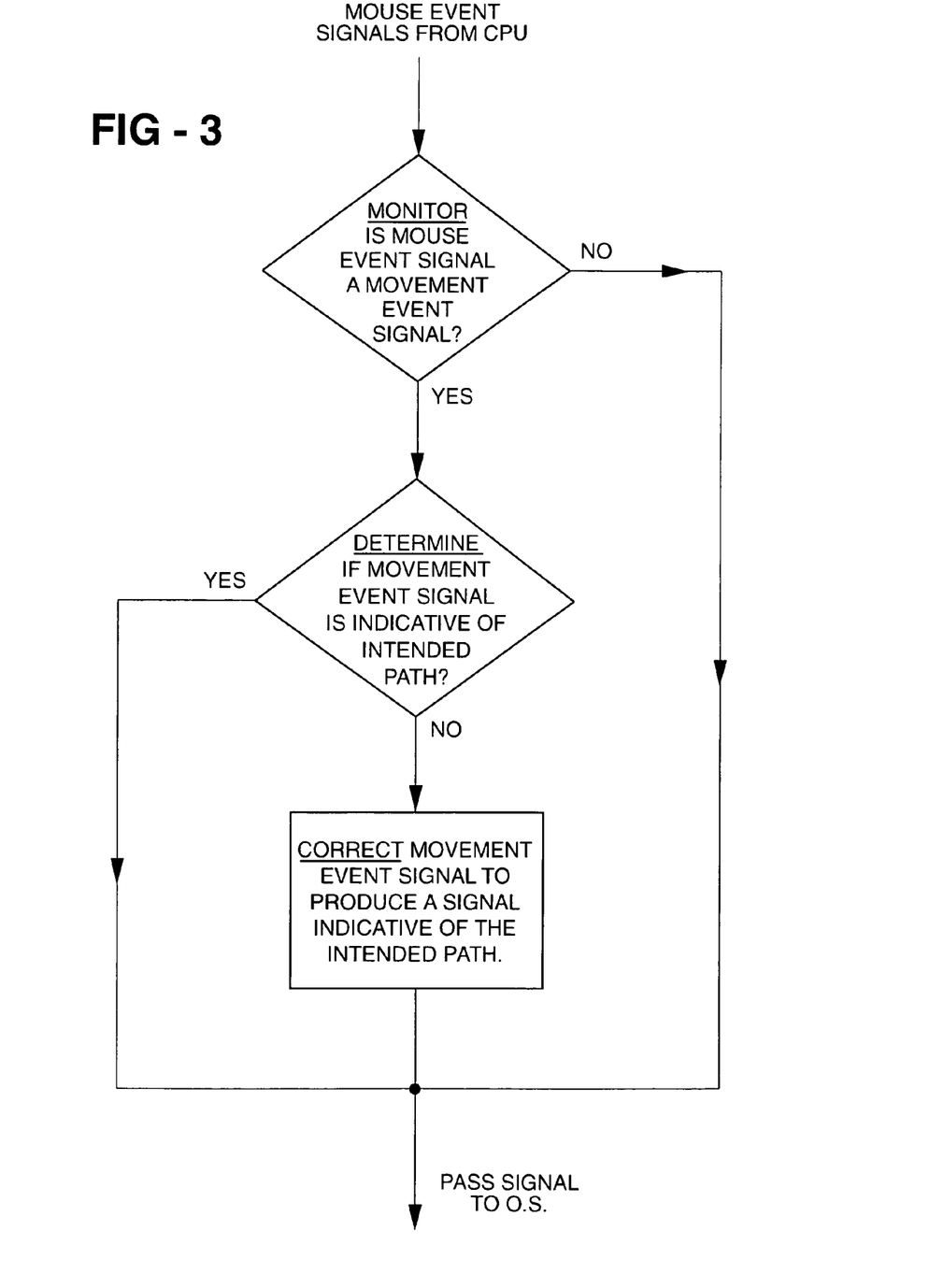
FIG. 3 illustrates a flowchart showing a method according to the present invention.

Referring now to FIG. 3, a flowchart detailing the routine for minimizing unintended cursor movement is shown. Reference numerals or letters in FIG. 3 which are like, similar, or identical to the reference numerals or letters of FIGS. 1–2 indicate like, similar, or identical components or features. The top of the flowchart indicates that CPU 100 sends all mouse event information signals through at least one stage of this routine. All mouse event information signals generated from mouse 109 are sent through the monitoring stage of the disclosed routine. In this stage, all mouse event information signals are checked to determine whether the mouse event information signal is a movement event information signal, i.e., the user is trying to change the location of cursor 200 on desktop 201 or is a clicking event information signal, i.e., the user is trying to select something on desktop 201 by depressing one of the mouse 109 buttons 115, 116. If, in this stage, the mouse event information signal is determined to be a clicking event information signal, the signal will be passed out of the routine and on to the operating system for processing. If the mouse event information signal is determined to be a movement event information signal, the mouse event information signal is then passed on to the next stage of the routine, the determining stage.

In the determining stage of a preferred embodiment of the present invention, the mouse event information signal, now determined to be a movement event information signal, is further evaluated. The best way to explain how the determining stage operates is with an example. Suppose the movement event information signal currently in the determining stage is not the initial movement event information signal of mouse 109, i.e., the user is halfway through drawing a line that would follow the +X-axis on an X-Y plane. From the past movement event information signals that have passed through the determining stage, an intended path can be discerned within a certain probability. With this intended path assumed to be accurate, the current movement event information signal in the determining stage is then evaluated to see if it falls within the expectations of this intended path. If the current movement event information signal is within the expectations of the intended path, it is then passed directly to the operating system for processing. If the current movement event information signal does not fall within the expectations of the intended path, the current movement event information signal is then passed on to the correcting stage. An alternate embodiment of the determining stage would involve frequent sampling of the movement event information signals in order to discern whether the actions by the mouse 109 producing the movement event information signals were intended or were a result of unintended influence such as muscle spasms or a bumpy road.

In the correcting stage, movement event information signals that appear to be erratic are changed in such a way that when sent out of the correcting stage they are indicative of the intended path. In the above example, recall that the user was trying to draw a line along the +X-axis of desktop 201. Suppose that while trying to draw this line, the user was experiencing muscle spasms which caused his or her hand to oscillate in the +Y and −Y directions while moving mouse 109 along the +X-axis. If the mouse event information signal were not processed as proposed herein, the line drawn would not be smooth; it would resemble a sawtooth pattern. The function of the correcting stage is to remove these frequent and repetitive mouse 109 movements from the movement event information signals processed by the operating system, resulting in a smooth line being drawn by this user. Once the movement event information signal has been processed, the corrected movement event information signal is then passed on to the operating system and the resulting cursor 200 movement is seen on desktop 201.

Figure 4A:
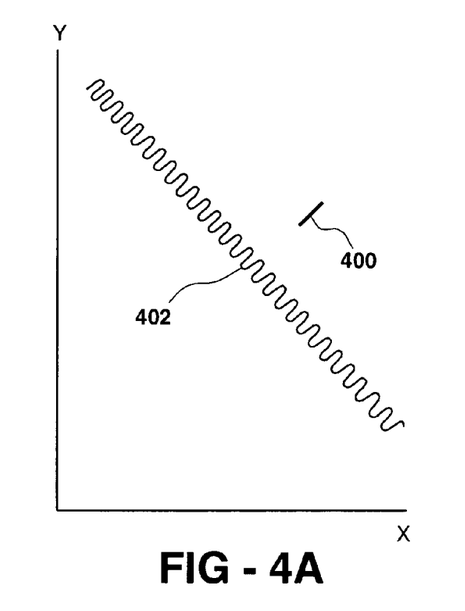
FIGS. 4A and 4B illustrate a before (FIG. 4A) and after (FIG. 4B) path of travel of a cursor, wherein the unintended movement is perpendicular to the intended path of travel, according to a preferred embodiment of the present invention.
Figure 4B:
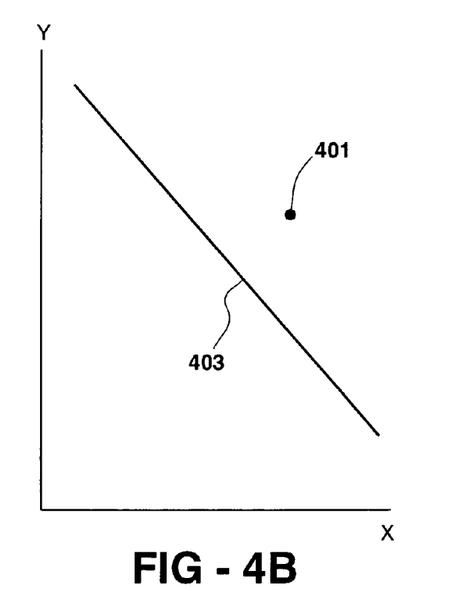

Referring now to FIGS. 4A and 4B, wherein a before (FIG. 4A) and an after (FIG. 4B) view of a line and a point are shown in which the user's hand shakes in a direction that is perpendicular to the intended path is shown. Reference numerals or letters in FIGS. 4A and 4B which are like, similar, or identical to the reference numerals or letters of FIGS. 1–3 indicate like, similar, or identical components or features. Short line 400, in FIG. 4A, is the result of the user trying to hold mouse 109 in one place without employing the present invention. Point 401, in FIG. 4B, is the result of the monitoring, determining, and correcting stages of the present invention. As can be seen, the effects of the shaking hand have been removed. Likewise, oscillating line 402, in FIG. 4A, is what the user would see if trying to draw a line from the upper left-hand corner of desktop 201 to the lower right-hand corner of desktop 201. Applying the routine of the present invention results in line 403 of FIG. 4B. Again, the effects of the user's shaking hand have been reduced and the desired results produced. The present invention is further configured to reduce any undesired or unintentional cursor movement associated with other line forms such as circles, curves, etc.

Figure 5A:
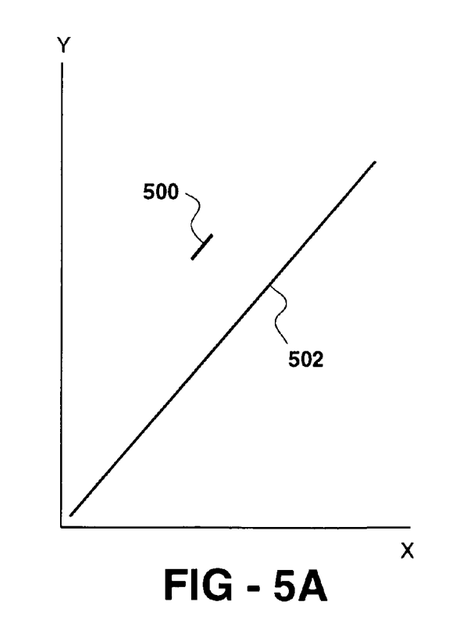
FIGS. 5A and 5B illustrate a before (FIG. 5A) and after (FIG. 5B) path of travel of a cursor, wherein the unintended movement is parallel to the intended path of travel, according to a preferred embodiment of the present invention.
Figure 5B:
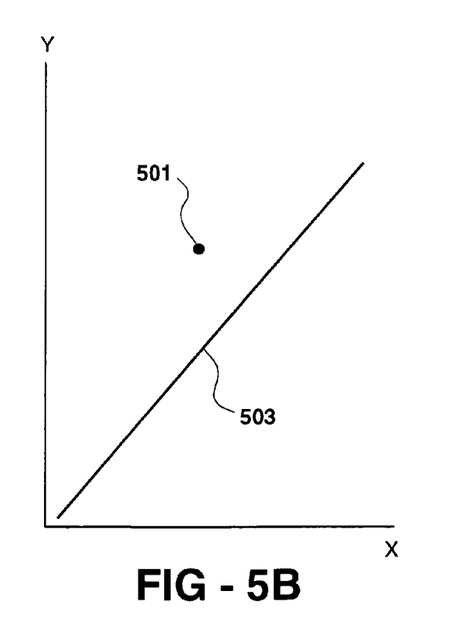

Referring now to FIGS. 5A and 5B, wherein a before (FIG. 5A) and an after (FIG. 5B) view of a line and a point are shown in which the user's hand shakes in the direction of the intended path is shown. Reference numerals or letters in FIGS. 5A and 5B which are like, similar, or identical to the reference numerals or letters of FIGS. 1–4B indicate like, similar, or identical components or features. Short line 500, in FIG. 5A, is the result of the user trying to hold mouse 109 in one place without employing the present invention. Point 501, in FIG. 5B, is the result of the monitoring, determining, and correcting stages of the present invention. As can be seen, the effects of the shaking hand have been removed. This scenario differs from that pictured in FIGS. 4A and 4B in that it is hard to discern between line 502 in FIG. 5A and line 503 in FIG. 5B. In this situation, the user is moving cursor 200 from the lower left-hand corner of desktop 201 to the upper right-hand corner of desktop 201. The shaking of the hand in the same direction as the intended path is also run through the monitoring, determining, and correcting stages of the present invention. The results can best be pictured if one imagines cursor 200 on desktop 201 executing each shake of the hand, oscillating back and forth, as well as executing the movement along the intended path versus cursor 200 only showing the movement along the intended path across desktop 201. The present invention is further configured to reduce any undesired or unintentional cursor movement associated with other line forms such as circles, curves, etc.

Figure 6A:
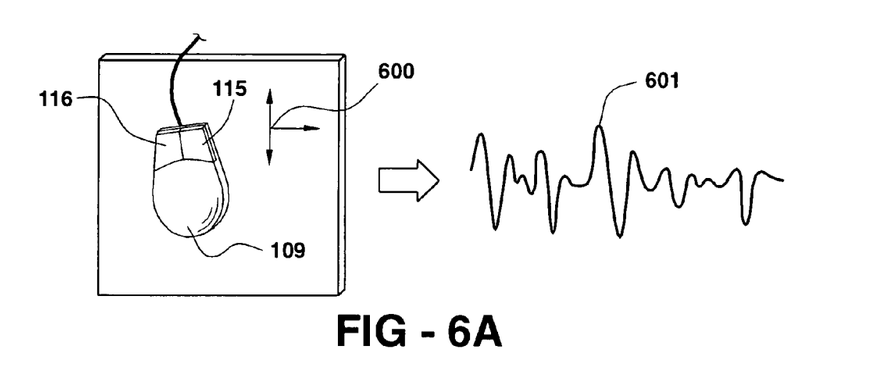
FIGS. 6A, 6B, and 6C illustrate an analog implementation of the method of FIG. 3 according to a preferred embodiment of the present invention.
Figure 6B:
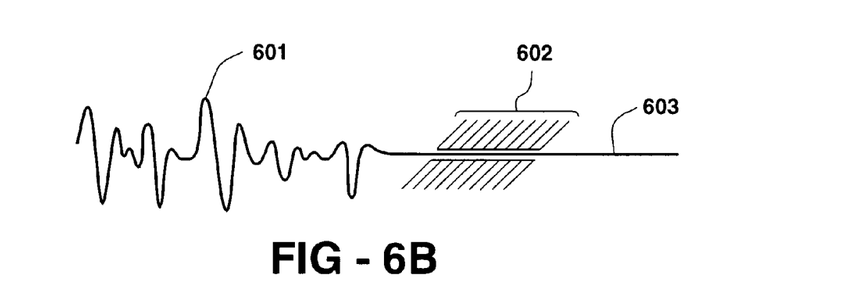
Figure 6C:
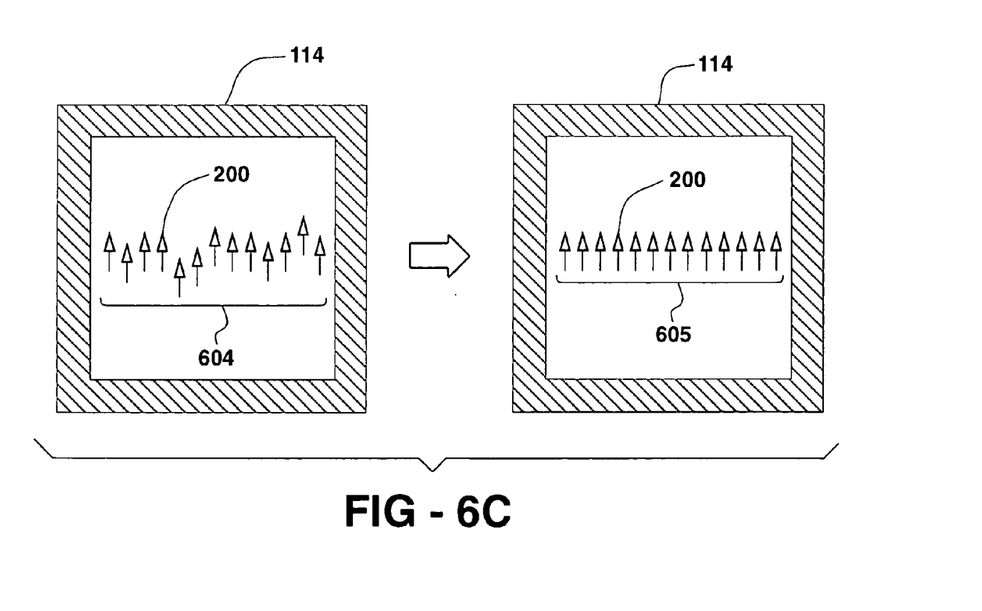

Referring now to FIGS. 6A, 6B and 6C, an analog representation of the process of correcting is pictured. Generation of a signal, FIG. 6A, the correcting process, FIG. 6B, and an uncorrected and corrected representation of the resultant cursor movement, FIG. 6C, are shown. Reference numerals or letters in FIGS. 6A, 6B and 6C which are like, similar, or identical to the reference numerals or letters of FIGS. 1–5B indicate like, similar, or identical components or features. When a user is moving mouse 109 along the +X-axis and is experiencing muscle tremors resulting in a +Y and −Y oscillation 600 of mouse 109, waveform 601 representative of this movement is generated. To remove the unintended oscillation of mouse 109, waveform 601 must be corrected to produce corrected waveform 603 that is representative of the net movement, or intended path, of mouse 109. Uncorrected cursor trail 604 and corrected cursor trail 605 are represented in FIG. 6C. FIG. 6C vividly illustrates the benefits of the present invention.

Figure 7A:
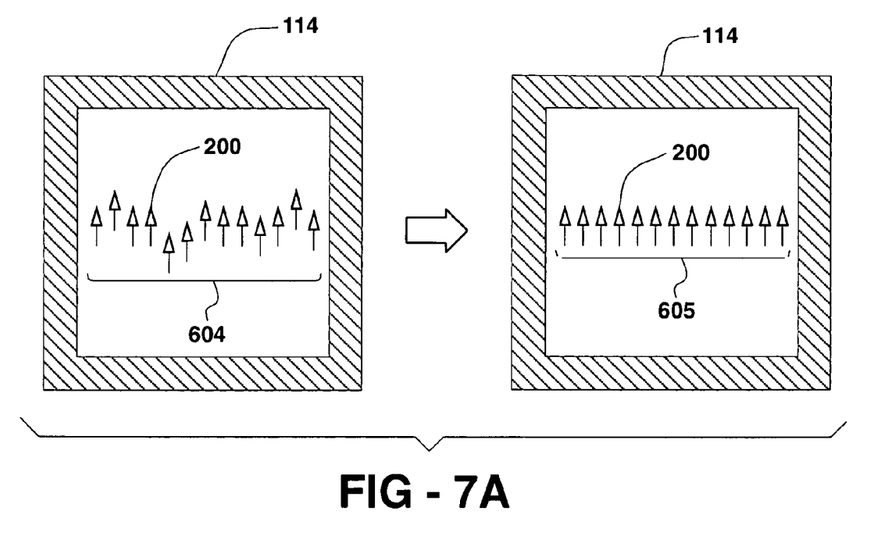
FIGS. 7A and 7B illustrate a digital implementation of the method of FIG. 3 according to a preferred embodiment of the present invention.
Figure 7B:
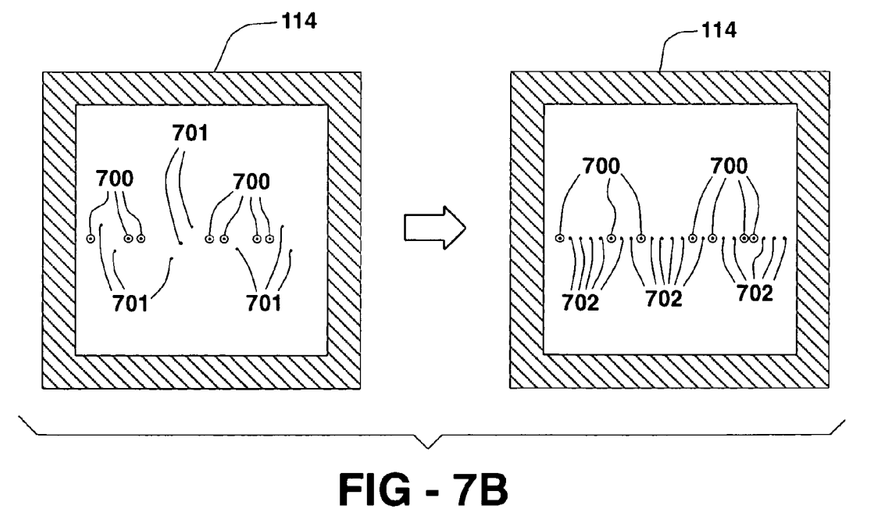

Referring now to FIGS. 7A, and 7B, uncorrected cursor trail 604 and corrected cursor trail 605, FIG. 7A, and a representation of cursor 200 location coordinates at distinct time intervals, FIG. 7B, are shown. Reference numerals or letters in FIGS. 7A and 7B which are like, similar, or identical to the reference numerals or letters of FIGS. 1–6C indicate like, similar, or identical components or features. When a user is moving mouse 109 along the +X-axis and is experiencing muscle tremors resulting in a +Y and −Y oscillation 600 of mouse 109 as in FIG. 6A, uncorrected cursor trail 604 occurs when the present invention is not employed. To employ the present invention in the digital domain in order to get corrected cursor trail 605 pictured in FIG. 7A, the routine explained above must obtain the cursor coordinates at distinct time intervals by converting the analog signal, representative of mouse's 109 motion, into a binary number, comprising binary logic bits, representative of a location in the X-Y plane of desktop 201. Each analog segment will yield a certain number of cursor coordinates representative of the mouse's motion. Some of these cursor coordinates will be intended path coordinates 700, and the others will be considered unintended coordinates 701. To correct these unintended coordinates 701 from the collection of cursor coordinates, the correcting routine must find a correlation between intended path coordinates 700 to create a correction factor or mask by which unintended coordinates 701 can be eliminated or removed from the path of travel of cursor 200. Once these unintended coordinates 701 have been masked, only intended path coordinates 700 remain. In order for cursor 200 to move across desktop 201 smoothly, the points in between intended path coordinates 700 must be interpolated. Interpolated coordinates 702 will be close enough together such that as cursor 200 assumes each coordinate, either intended path 700 or interpolated 702, it will appear to be "sliding" across desktop 201.

Figure 8:
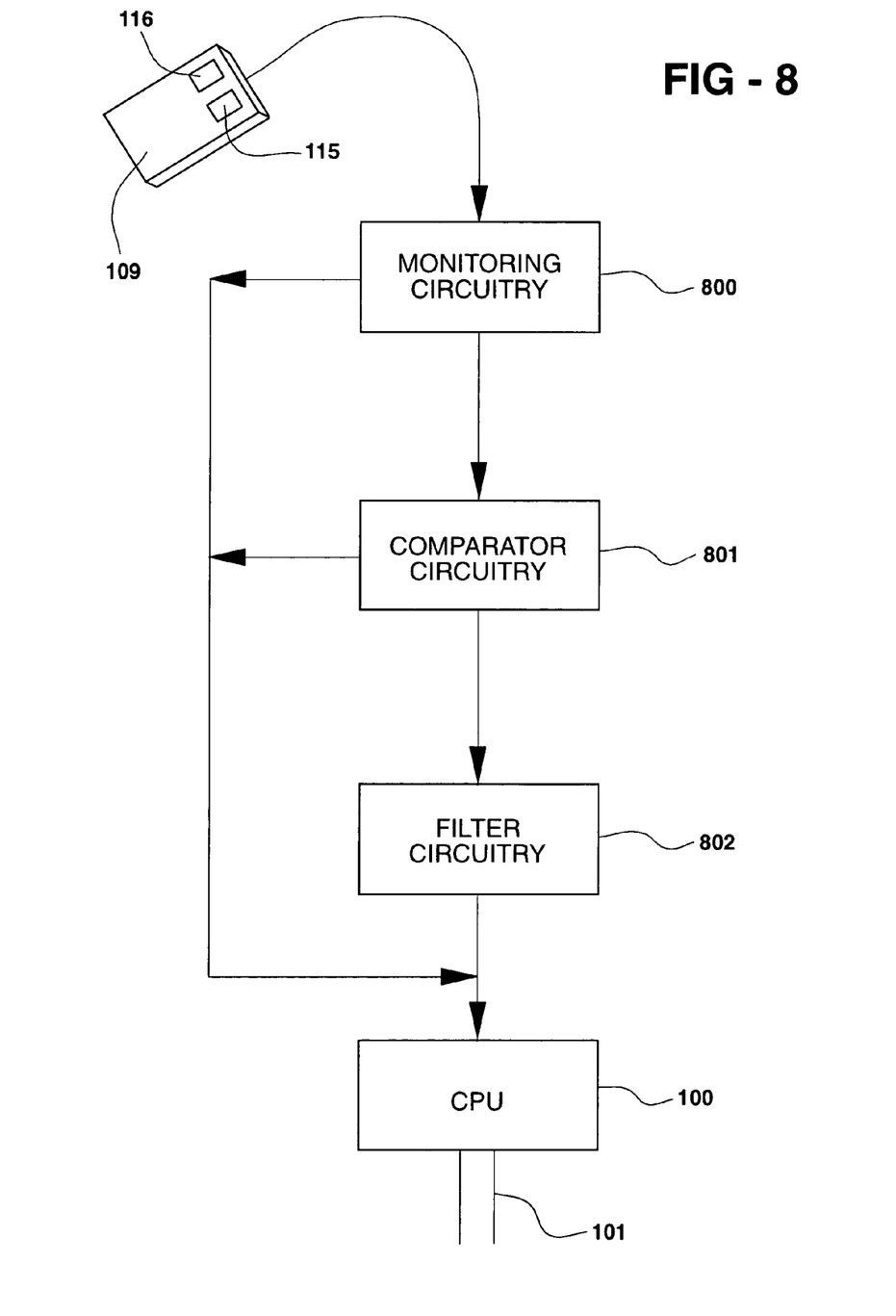
FIG. 8 is a block diagram of a hardware implementation of the method depicted in FIG. 3 according to the present invention.

Referring now to FIG. 8, a block diagram of the hardware implementation according to a preferred embodiment of the present invention is shown. Instead of implementing the aforementioned method for minimizing unintended cursor movement in software, it would be possible to design a circuit or series of circuits that could accomplish the same results. This circuit or series of circuits can be incorporated into the mouse or cursor control device itself allowing the mouse or cursor control device to send modified or corrected movement signals to system CPU 100 for processing. As shown in FIG. 8, mouse 109 will generate a signal when the user either presses one of the attached buttons 115, 116 or moves the mouse 109 to achieve cursor 200 movement. The signal generated from this user interaction is processed by monitoring circuitry 800 to discern whether the signal is generated by the pressing of button 115 or 116 or a movement of mouse 109. If monitoring circuitry 800 determines the signal to have been generated by button 115 or 116, the monitoring circuitry 800 then passes the signal on to CPU 100 for processing as a mouse event information signal. If, on the other hand, monitoring circuitry 800 determines the signal to have been generated by movement of mouse 109, it then passes the movement signal on to comparator circuitry 801 operably coupled to monitoring circuitry 800. Once the signal is received by comparator circuitry 801, the signal is evaluated to determine whether it is indicative of the intended path or if it is an erratic, ancillary signal. If the signal is determined to be indicative of the intended path, comparator circuitry 801 then passes the movement signal on to CPU 100 for processing as a mouse event information signal. If comparator circuitry 801 determines the movement signal to be ancillary, comparator circuitry 801 then passes the signal on to correction circuitry 802 to which it is operably coupled. Once the movement signal is received by correction circuitry 802, the signal is corrected to produce a signal that is indicative of the intended path and then passed on to CPU 100 for processing as a mouse event information signal. An alternate embodiment for the hardware implementation of the aforementioned method would allow for the monitoring, comparing, and correcting to be done within CPU 100.

An alternate embodiment of the present invention further includes a method, performed in the information handling system 10, for minimizing unintended cursor movement which further includes a method for learning and adapting to a user's cursor movement style. When the aforementioned method for minimizing unintended cursor movement is employed, an information signal and a corrected information signal are available. By taking the difference between the information signal and the corrected information signal and storing this difference, the information handling system 10 can, after a period of time, create a data set of results that will enable a probability function, such as a line of best fit or any other effective function, indicative of the stored data set to be determined. This probability function, or correction factor, results in a movement event information signal indicative of the intended path when applied to newly generated movement event information signals. Employment of this additional methodology will eventually allow the routine for minimizing unintended cursor movement to skip the determining stage and go directly to the correcting stage. This advancement will not only allow faster processing of movement event information signals, but it will also allow customization of the information handling system to a user and his or her cursor movement habits.

In summary, the present invention is designed primarily to remove the effects associated with shaking diseases, such as Alzheimer's, incurred while using a cursor control device, although the present invention can be utilized for other purposes without departing from its spirit and scope. By being able to detect erratic movement, the present invention can correct the movement events and signals associated with the cursor movement such that the user only sees their intended movement on their display. The present invention is most likely to be employed after the application of known movement correcting techniques, such as techniques used to reduce the effects of bumpy roads, low batteries, noise, etc. Removing the erratic cursor movement caused by shaking diseases, post application of known correcting techniques, will allow shaking disease sufferers to be able to make smooth lines, circles, curves, etc., when utilizing a cursor control device. Correction of erratic cursor movement can be performed utilizing hardware included in the cursor control device itself, hardware included in the system utilizing the cursor control device, or in software being utilized on the system employing the cursor control device.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 102 of one or more computer or information handling systems configured generally as described in FIGS. 1–8. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

I claim:

1. A system for minimizing unintended cursor movement comprising:

a cursor control device for controlling movement of a cursor on a computer, the cursor control device being connectable to and disconnectable from the computer, the cursor control device comprising:

a housing freely movable by a hand of a user to indicate desired movement of a cursor;

a monitoring device configured to monitor an information signal indicative of movement of the cursor along an intended path;

a comparing device configured to determine whether any portions of said monitored information signal are not indicative of said intended path; and a correcting device configured to remove said portions which are not indicative of said intended path to form a corrected information signal;

wherein the monitoring device, comparing device, and the correcting device are located in the housing of said cursor control device so that said cursor control device is configured to send the corrected information signal to any computer to which said cursor control device is connected for processing to move the cursor on the computer.

2. The system as defined in claim 1, wherein said correcting device is configured to pass said monitored information signal through a filter so that said corrected information signal is indicative of said intended path.

3. The system as defined in claim 1, wherein said monitoring device is configured to monitor one or more binary logic bits.

4. The system as defined in claim 3, wherein said correcting device is configured to remove one or more binary logic bits from said monitored binary logic bit signal so that said corrected information signal is indicative of said intended path.

5. The system as defined in claim 4, wherein said correcting device is further configured to interpolate binary logic bits along said intended path to replace said one or more binary logic bits removed.

6. The system as defined in claim 1, wherein said cursor control device is configured to:

take the difference between said information signal and said corrected information signal;

store said difference between said information signal and said corrected information signal.

7. The system as defined in claim 6, wherein said cursor control device is further configured to:

determine a correction factor from said stored difference;

wherein said correcting device is further configured to correct said information signal based upon the correction factor to form said corrected information signal.

8. The system as defined in claim 1, wherein said cursor control device comprises a computer mouse.

9. An information handling system for minimizing unintended cursor movement comprising:

at least one processor;

memory operably associated with said processor; and a computer mouse device for controlling movement of a cursor, said computer mouse device including a housing movable by a hand of a user to indicate desired movement of a cursor, said housing of said computer mouse device incorporating:

a monitoring device configured to monitor an information signal indicative of movement of the cursor along an intended path;

a comparing device configured to determine whether any portions of said monitored information signal are not indicative of said intended path; and a correcting device configured to remove said portions which are not indicative of said intended path to form a corrected information signal;

wherein said computer mouse device is configured to output the corrected information signal to said at least one processor for processing;

wherein said housing of said computer mouse device defines an interior, and said monitoring device, said comparing device, and said correcting device are positioned in said interior of said housing of said computer mouse device.

10. The system as defined in claim 9, wherein said correcting device is configured to pass said monitored information signal through a filter so that said corrected information signal is indicative of said intended path.

11. The system as defined in claim 9, wherein said monitoring device is configured to monitor one or more binary logic bits.

12. The system as defined in claim 11, wherein said correcting device is configured to remove one or more binary logic bits from said monitored binary logic bit signal so that said corrected information signal is indicative of said intended path.

13. The system as defined in claim 12, wherein said correcting device is further configured to interpolate binary logic bits along said intended path to replace said one or more binary logic bits removed.

14. The system as defined in claim 9, wherein said information handling system is configured to:

take the difference between said information signal and said corrected information signal; store said difference between said information signal and said corrected information signal.

15. The system as defined in claim 14, wherein said information handling system is further configured to:

determine a correction factor from said stored difference;

wherein said correcting device is further configured to correct said information signal based upon the correction factor to form said corrected information signal.

* * * * *